Dec. 17, 1940.       O. G. WATT       2,225,023
COMBINATION WATER AND ROOM HEATER
Filed May 15, 1939       4 Sheets-Sheet 1

Inventor
Oscar G. Watt,
By Barry + Cyr
Attorneys

Dec. 17, 1940.   O. G. WATT   2,225,023
COMBINATION WATER AND ROOM HEATER
Filed May 15, 1939   4 Sheets-Sheet 2
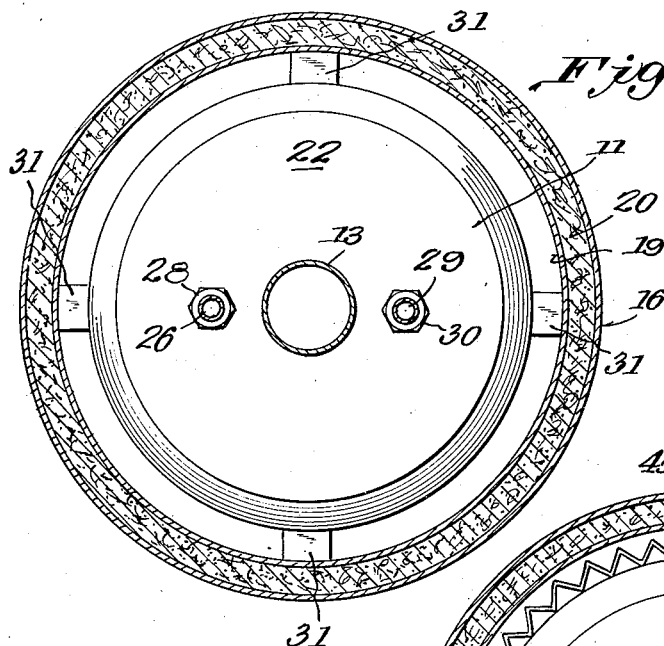
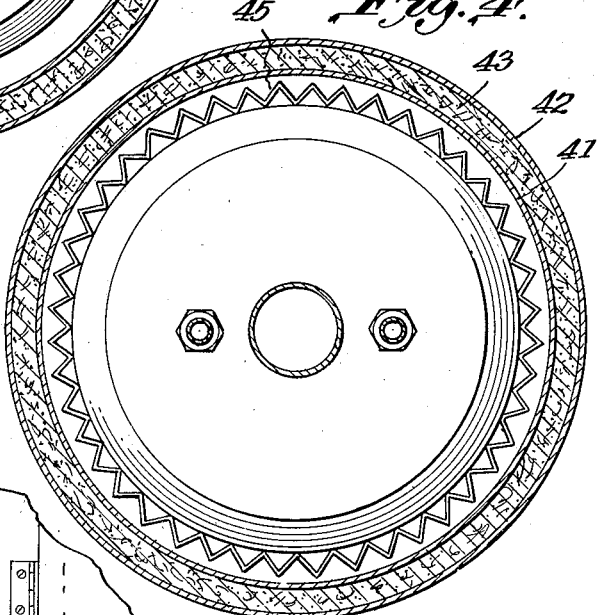
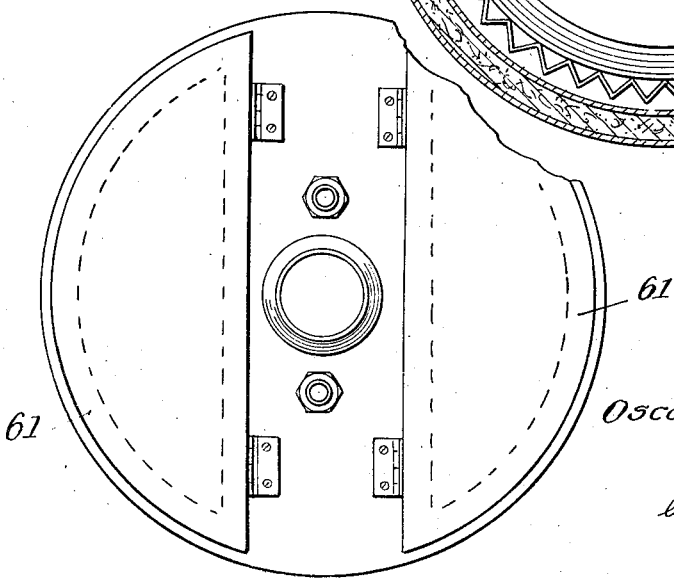
Inventor
Oscar G. Watt
Barry + Cyr
Attorneys

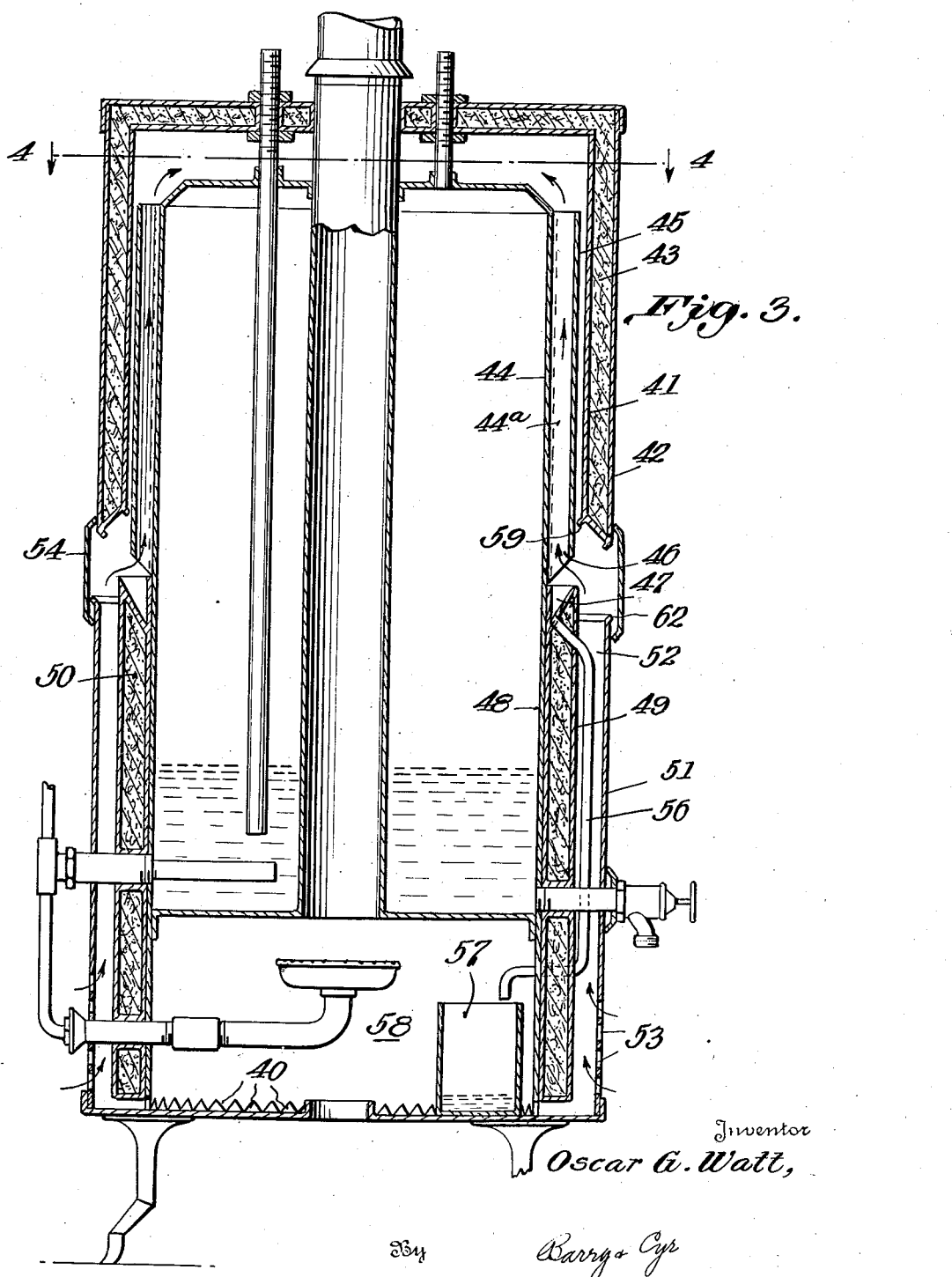

Dec. 17, 1940.　　　　O. G. WATT　　　　2,225,023
COMBINATION WATER AND ROOM HEATER
Filed May 15, 1939　　　4 Sheets-Sheet 4
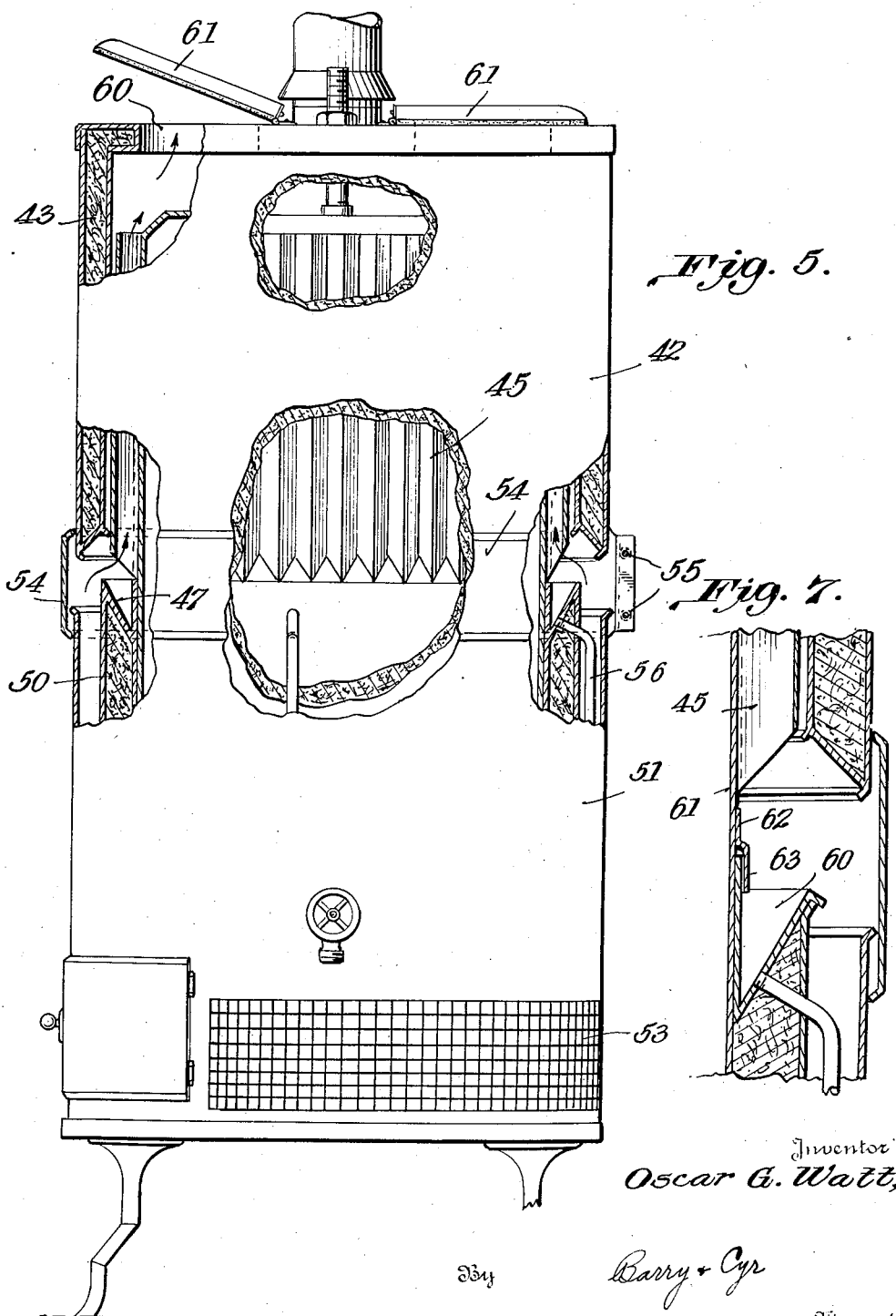

Patented Dec. 17, 1940

2,225,023

UNITED STATES PATENT OFFICE 2,225,023

COMBINATION WATER AND ROOM HEATER

Oscar G. Watt, Tulsa, Okla.

Application May 15, 1939, Serial No. 273,803

11 Claims. (Cl. 237—17)

This invention relates to a combination water heater and room heater.

There are many types of hot water heaters, some of which are automatic and others non-automatic, and some of such heaters are insulated and others uninsulated. However, the automatically controlled heaters are perhaps the most popular, and where first cost is not the controlling factor in the purchase of a water heater, the automatic insulated heater is generally preferred since it always affords a ready supply of hot water, and the insulation not only effects a saving in fuel but also prevents overheating in summer of the room in which the heater is located. The uninsulated heater acts as a room heater in the winter time, as the outer surface of the hot water tank provides many square feet of radiating surface, and this aids in warming, but is not sufficient to properly heat the average bathroom or kitchen in winter time. Furthermore, if an uninsulated heater is located in a bathroom, there is constant danger of an unclad bather being seriously burned. Another disadvantage of the uninsulated heater is, if the room air is warm and humid, and the incoming supply of water to the heater is cold, as in the winter time, then each time a liberal supply of hot water is drawn from the tank, and its surface becomes cold, condensation will form on the tank in sufficient quantity to drip on the floor.

The primary object of this invention is to utilize the favorable and eliminate the unfavorable features of the present day automatic insulated hot water heater, and to provide a heating apparatus that will perform a dual service, i. e., heating water and room air, yet with each service under separate control of the user.

A further object of the invention is to provide a bathroom heater that will eliminate the open flame gas or oil heating stove in the bathroom, which stove has a triple hazard: That of burning the bather; asphyxiation of the bather; or burning the building when some article of clothing is tossed on the hot stove.

A further object is to provide a heater that will insure a warm bathroom when there is hot water for the bath. If my improved water heater is located in the kitchen, in this modern day of insulated ranges, the hot water heater will keep the kitchen warm during the night, but when cooking is being done, no overheating of the kitchen will result, since the warm air produced by the water heater may be shut off.

A still further object of the invention is to provide a simple and relatively inexpensive structure, and yet one which will be exceedingly effective for the purposes for which it is designed.

Having now indicated in a general way the nature and purpose of my invention, I will proceed to a detail description thereof, with reference to the accompanying drawings, in which I have illustrated preferred embodiments, and in which—

Fig. 2 is a transverse sectional view on the line 2—2 of Fig. 1.

Fig. 3 is a view similar to Fig. 1, but showing a modification.

Fig. 4 is a transverse sectional view, taken on the line 4—4 of Fig. 3.

Fig. 5 is an elevation of the structure shown in Fig. 3, but with parts broken away and in section to illustrate internal features of the invention.

Fig. 6 is a top plan view of the heater shown in Figs. 3 and 5.

Fig. 7 is an enlarged vertical sectional view of a modified detail of the invention.

Figure 1:
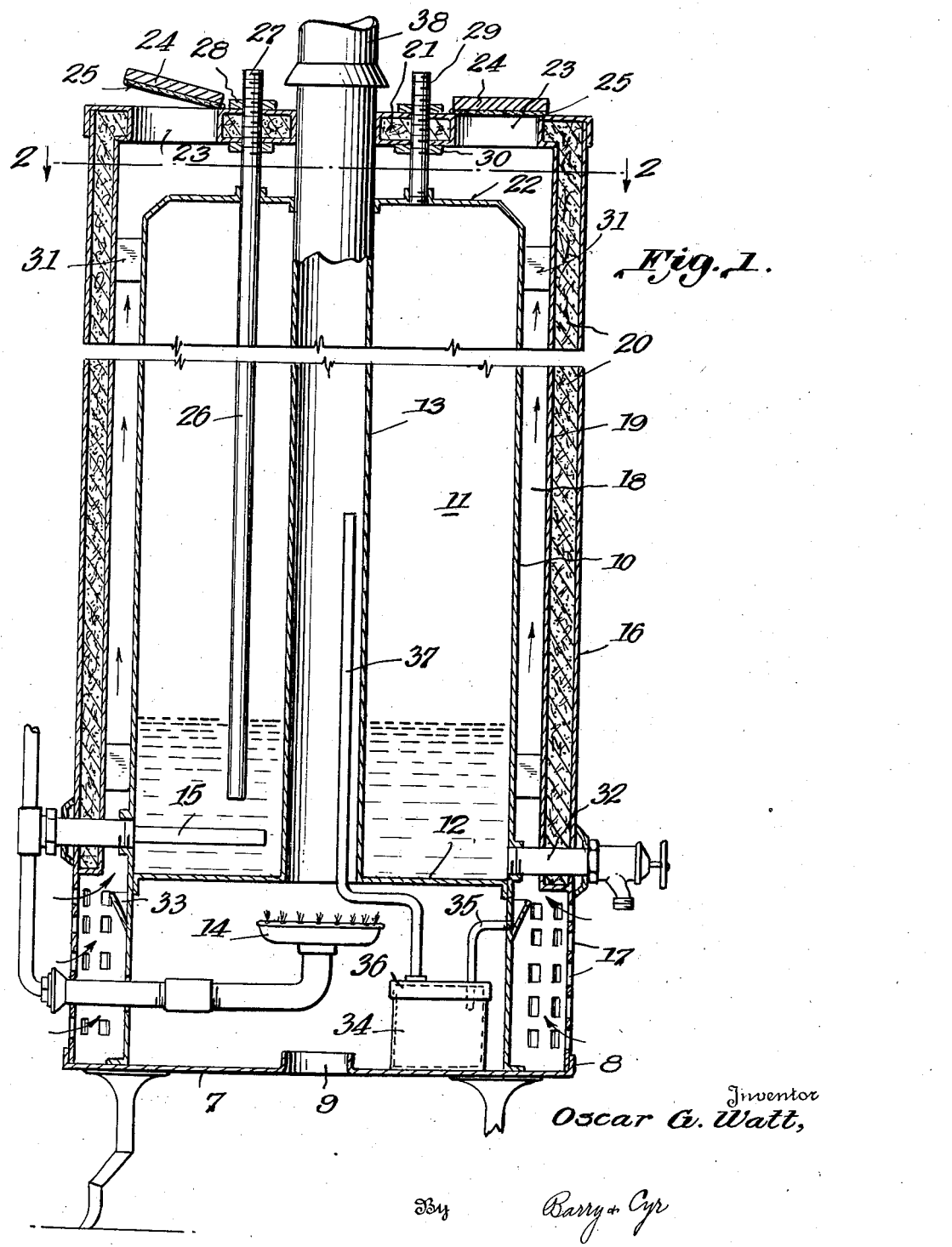
Fig. 1 is a diametrical vertical sectional view of the simplest form of the invention.

Referring first to the structure shown in Figs. 1 and 2, the reference character 7 designates a leg supported base or bottom pan having an upstanding rim 8 and a centrally disposed air inlet 9.

The base supports the shell 10 of a boiler or hot water storage tank 11 which has a bottom 12 and a central heating flue 13, the latter being adapted to discharge products of combustion from a fuel burner 14 which is located between the pan 7 and bottom 12.

The parts 10, 12 and 13 are formed of any suitable heat conducting metal.

The supply of fuel to the burner may be controlled by any conventional thermostatic device such as the one indicated at 15.

The pan 7 also supports an outer shell 16, the lower portion of which is perforated as indicated at 17 to permit relatively cold air to enter the lower end of an annular passageway 18 which surrounds the tank 11. An inner shell 19 forms the outer wall of such passageway and the space between the shells 16 and 19 is filled with any suitable heat insulated material 20, such material extending into the hollow top 21 of the heater. This top is preferably spaced from the top 22 of the boiler, and this space communicates with one or more hot air outlets 23 provided at the top of the heater. The outlets are controlled by any suitable type of closure such as hinge doors 24 having layers 25 of insulating material at the bottom thereof.

Water enters the tank through a pipe 26 which extends through the tops 21 and 22, and into close proximity to the bottom 12 of the tank, such pipe being screw threaded as shown at 27 to accommodate nuts 28 that may be employed in detachably securing the casing of the heater to the pipe 26.

An outlet pipe 29 extends upwardly from the top of the tank through the top 21 of the casing, and is threaded to accommodate nuts 30 which also secure the casing to the tank.

Spacers 31 are employed between the casing and the tank, and are preferably secured to only one of these members so that the casing can be removed when desired.

A valved drain pipe 32 has a threaded engagement with the lower end of the tank.

To prevent water condensed from the air travelling through the passageway 18 from dripping on the floor, the lower portion of the shell 10 is surrounded by a trough 33 to gather such drippings and pass the same to a small tank 34 through a tube 35. This tank is arranged between the bottoms 7 and 12 and has a cover 36 that is connected to a vapor conveying pipe 37 that extends into the flue 13. Due to this construction, any condensate arriving in the chamber 34 will be vaporized by the heat of the flame from the burner 14, and will be discharged through the tube 37 and mixed with the gases of combustion before the latter pass out through the vent pipe 38 at the top of the heater.

In operation, water stored in the tank 11 will be maintained at a substantially constant temperature by the thermostat 15 acting on the fuel supplied to the burner 14, and as hot water is withdrawn through the pipe 29, cold water to take its place will be introduced through the pipe 26. In winter time, the doors 24 may be held in open position, and consequently, relatively cold air will enter at 17, travel up the passageway 18 and be discharged through 23 into the room where the heater is located. In the summer time, or when heating of the room is not desired, the doors 24 will be kept closed, and owing to the insulation 20, the heat will not be dissipated but will be impounded in the water in the tank 11.

Should it become necessary to remove the casing from the tank, this can be accomplished by removal of the upper nuts 28 and 30, and the parts 14, 15 and 32. Then the casing can be lifted upwardly off the tank.

It is believed that the construction, operation and advantages of this form of the invention may be readily understood without further description.

Referring now to the structure shown in Figs. 3 to 6 inclusive, it will be noted that the lower or coldest portion of the tank is insulated to prevent the escape of heat, while the upper portion is used to supply heat to the air that is heated by the device. In this form of the invention, the bottom of the heater, the tank, burner, thermostat, water inlet pipe, water outlet pipe and water drain valve may be like that illustrated in Figs. 1 and 2, with the exception that the lower edge of the wall of the tank is provided with serrations or the like, as illustrated at 40, for a purpose hereinafter described.

In this embodiment, the upper portion of the casing comprises an inner wall 41 and an outer wall 42 which are spaced apart by insulation 43. These walls terminate about midway of the height of the tank, and the wall 41 is spaced from the wall 44 of the tank to provide an annular passageway 44a in which the air is heated. In this passageway I arrange a metallic jacket 45 of zigzag shape in horizontal section, with the inner points of the V's contacting the shell of the tank so that heat conducted from the tank will heat up the jacket and the latter will impart heat to the air rising in the air passageway.

The lower edge of the jacket 45 is fluted or notched as shown at 46 so that condensation gathering on the surfaces of the jacket 45 will be guided toward the shell of the tank, to be deposited in a trough 47 surrounding the shell of the tank.

The lower portion of the tank shell is preferably surrounded by a spaced walls 48 and 49 between which there is an annular layer 50 of insulating material.

A lower outer annular wall 51 surrounds the wall 49 and is spaced from the latter to provide an air passageway 52 which receives cold air from the room through perforations 53 in the lower portion of the wall 51.

As there is a gap between the upper end of the wall 51 and the lower end of the wall 42, I close this gap by a removable split band 54 held in position by any suitable means such as bolts 55 (Fig. 5).

A tube 56 conveys condensate from the trough 47 into a receptacle 57 which may be removably arranged in the lower portion of the heater, and any condensate which may enter the passageway 52 can drip downwardly onto the bottom of the heater and enter the burner chamber 58 through the serrations 40.

An annular flange 59 is arranged at the lower end portion of the wall 41 and extends inwardly toward the vertical axis of the tank so that any condensate dripping down the surface of the wall 41 will be deflected into the trough 47.

Like in the structure shown in Figs. 1 and 2, the casing in this construction may be removed from the tank. This may be accomplished by first removing the band 54, then the upper portion of the casing, and finally the wall 51 and the insulated jacket 50 in a manner which will be obvious.

Like in Figs. 1 and 2, the upper portion of the casing is provided with air discharge ports 60 controlled by hinge doors 61 or the like.

It will be noted that no improvement or claim is made for the water heating or water temperature control features of this apparatus, as they may be of standard makes found on the present day markets. What I believe to be new is the manner in which the tank is encased in the insulating jackets; the control of the room air circulated at will through the air passage or passages and over the surface of the hot water tank; the increasing of the tank's radiating surface which conducts the heat from the water and transfers it to the room air; the manner of reducing condensation on the tank surface to a minimum by insulating the cold part of the tank (Figs. 3 to 6 inclusive); and the trapping and final disposal of the condensate.

In order to get as much and as rapid heat transfer as possible, I will consider the manner of increasing the tank's radiating surface. This can be accomplished in different ways and to as much of the tank's surface as desired, but for the purpose now sought, it is more desirable to use only that part of the tank that remains the hottest for the longest period of time which of course, is the upper portion. That, as before stated, is surrounded by a heat conducting jacket of special construction, as described in connection with Figs. 3 to 6 inclusive.

Obviously, the heat transfer of the V-shaped air passages provided by such construction depends on the conductivity of the metal used, the length and size, and the temperature difference between the room air and water in the tank.

Since slowly moving water or condensate trickling down a vertical or steeply inclined surface has a tendency to cling to that surface, particular attention is called to the lower ends 46 of the V-shaped passageways, as they are cut on an approximately 45° angle in order to lead any condensate trickling down their surface over to the wall of the tank and safely into the trough 47.

Since the tank is to perform a dual service, that of acting as a storage tank and also as a radiator to warm the room air, it is necessary to insulate it in the manner best suited for this service. When the hot water faucet is open, cold water comes into the tank through the supply pipe down through the boiler to near the bottom of the tank and forces the hot water out through the outlet pipe. Thus there are times when the tank will be cold at the bottom and hot at the top, and in order to prevent the lower cold portion of the tank from cooling the room air as it passes up through the space 52, I prefer the construction disclosed in Figs. 3 to 6 inclusive, as the insulation at the lower portion of the tank wall protects such wall from the air passageway, while the structure is just reversed at the upper portion of the tank where the air passageway is in contact with the wall of the tank.

It will be noted that the upper edge 62 of the wall 51 of the casing is flared outwardly toward the band 54 to prevent moisture from gathering between the lower edge of the band and the upper edge of the wall 51.

The room air could be admitted to the air passageway 44a through the band 54, and the outer jacket 51 eliminated, but there is less stratification of room air and better results obtained by admitting such air at an elevation near the floor, as at 53.

While I have shown the condensate trough as being formed integral with the tank 11 (Fig. 1), or integral with the jacket 48, 49 (Fig. 3), it will be observed from Fig. 7 that such troughs may be made separate and connected to the water tank in any suitable manner. Referring now to Fig. 7, the trough 60 is welded or otherwise secured directly to the water tank 61, and in order to prevent water or condensate from dripping down between the trough and the tank, I provide a condensate shed or band 62 having a depending skirt 63 projecting over the inner wall of the trough. This band may be placed on the tank before the unfinished tank is submerged in its bath of molten galvanizing metal, thus bonding the band 62 to the tank by a water-tight metallic bond. With a structure of this character it will be seen that any water or condensate dripping down from the water tank or jacket will be deflected away from said tank by the skirt 63 and directed into the trough.

From the foregoing it is believed that the construction, operation and advantages of my invention may be readily understood by those skilled in the art, without further description, and it is manifest that changes may be made in the details disclosed, without departing from the spirit of the invention, as expressed in the claims.

What I claim and desire to secure by Letters Patent is:

1. In a heater of the character described, water storage means, a burner for use in heating water in such means, an insulated jacket arranged about said means and spaced from the latter to provide an air passageway, means for controlling the passage of air through said passageway, and means for gathering condensate dripping from said storage means.

2. A combination heater comprising a hot water storage tank having an upstanding wall formed of heat conducting metal, an insulated jacket enclosing said tank and having a portion spaced from the wall of the tank to provide an air passageway having an inlet at the lower portion of the heater and an outlet at the upper portion of the heater, means for controlling the discharge of hot air from said passageway, and means for gathering condensate water which may trickle down said passageway.

3. A combination heater of the character described, comprising a hot water storage tank, fuel burning means for heating the contents of said tank, an insulated jacket enclosing said tank and spaced from the latter to provide an air passageway extending along the wall of the tank, an air inlet to the passageway arranged at the lower end portion of said jacket, an air outlet arranged at the upper end of the jacket, means cooperating with said outlet for controlling the discharge of hot air from said passageway, and a trough arranged at the lower end of the passageway for gathering condensate water which may trickle down the passageway.

4. A combination heater of the character described, comprising a hot water storage tank having an annular wall and a central flue, a fuel burner arranged beneath the central portion of the tank for use in heating the contents of the tank, an insulated jacket enclosing a portion of the tank and having an annular wall surrounding the wall of the tank and spaced from the latter to provide an annular air passageway, means for introducing relatively cold air into the lower end of said passageway, an outlet for hot air at the top portion of the jacket, means for controlling the discharge of hot air from said outlet, and an annular trough arranged at the lower end of said passageway for gathering any water which may be condensed from the air passing through said passageway.

5. A combination heater of the character described, comprising a hot water storage tank having an annular wall and a central flue, a fuel burner arranged beneath the central portion of the tank for use in heating the contents of the tank, an insulated jacket enclosing a portion of the tank and having an annular wall surrounding the wall of the tank and spaced from the latter to provide an annular air passageway, means for introducing relatively cold air into the lower end of said passageway, an outlet for hot air at the top portion of the jacket, means for controlling the discharge of hot air from said outlet, an annular trough arranged at the lower end of said passageway for gathering any water which may be condensed from the air passing through said passageway, a water receiver adapted to be heated by the flame from said burner for vaporizing any water gathering in the receiver, means for conducting water from the trough to the receiver, and a vapor pipe extending from the receiver into said flue.

6. A combination heater of the character described, comprising a hot water storage tank having an annular wall and a central flue, a fuel burner arranged beneath the central portion of the tank for use in heating the contents of the tank, an insulated jacket enclosing a portion of the tank and having an annular wall surrounding the wall of the tank and spaced from the latter to provide an annular air passageway, means for introducing relatively cold air into the lower end of said passageway, an outlet for hot air at the top portion of the jacket, means for controlling the discharge of hot air from said outlet, and an internal jacket of heat conducting material arranged in said passageway, said internal jacket being of corrugated form and providing vertical flutes having portions abutting against the annular wall of the tank, the lower edge of the internal jacket being serrated to form V-shaped edges for guiding condensate toward the wall of the tank.

7. The combination heater of the character described, comprising a hot water storage tank having an annular upstanding wall, a lower insulated jacket surrounding the lower portion of said wall, an upper insulated jacket enclosing the upper portion of the tank and spaced from the latter to provide an air passageway, means for introducing relatively cold air into the lower end of said passageway, an outlet for hot air arranged at the upper portion of the upper jacket, means for controlling the passage of air through said passageway, an outer wall surrounding the lower insulated jacket and spaced from the lower end of the upper jacket, and a removable band bridging the space between the lower end portion of the upper jacket and said outer wall.

8. A combination heater of the character described, comprising a hot water storage tank having an annular upstanding wall, a lower insulated jacket surrounding the lower portion of said wall, an upper insulated jacket enclosing the upper portion of the tank and spaced from the latter to provide an air passageway, means for introducing relatively cold air into the lower end of said passageway, an outlet for hot air arranged at the upper portion of the upper jacket, means for controlling the passage of air through said passageway, a condensate gathering trough arranged at the upper end portion of the lower jacket and positioned at the lower end of said passageway, and means at the lower end portion of the upper jacket for guiding condensate toward said trough.

9. In a heater of the character described, water storage means, a burner for use in heating water in such means, an insulated jacket arranged about said means and spaced from the latter to provide an air passageway, means for controlling the passage of air through said passageway, a trough at the lower portion of said air passageway for gathering condensate dripping from said storage means, and means for deflecting condensate away from said storage means and into said trough.

10. A combination heater comprising a hot water storage tank having an upstanding wall formed of heat conducting metal, an insulated jacket enclosing said tank and having a portion spaced from the wall of the tank to provide an air passageway having an inlet at the lower portion of the heater and an outlet at the upper portion of the heater, an undulated metallic heat conducting jacket disposed in the air passageway and having portions contacting the tank at a plurality of points, said metallic jacket also having fluted portions cooperating with said wall to form auxiliary air ducts in said passageway and means for controlling the passage of air through said passageway.

11. A combination heater of the character described, comprising a hot water storage tank having a side wall, a burner arranged below the tank for use in heating the water, an air passageway extending along said wall, an outer insulated casing member positioned at the outer side of the passage for preventing dissipation of heat from the air passing through said passageway, and means for increasing the conductivity of heat in said passageway, said means comprising a metallic jacket arranged in said passageway and having substantially V-shaped portion contacting said wall, and means for controlling the passage of air through the air passageway, the inlet of the passageway being arranged at the lower portion of the heater, and the outlet being positioned at the top portion of the heater.

OSCAR G. WATT.